United States Patent [19]

Binkley

[11] Patent Number: 4,838,118
[45] Date of Patent: Jun. 13, 1989

[54] ANTI-SPIN DIFFERENTIAL

[75] Inventor: Carl R. Binkley, Marshall, Mich.

[73] Assignee: Eaton Corporation, Cleveland, Ohio

[21] Appl. No.: 166,273

[22] Filed: Mar. 10, 1988

[51] Int. Cl.$^4$ .............................................. F16H 1/44
[52] U.S. Cl. ...................................... 74/711; 74/710.5
[58] Field of Search ............................... 74/711, 710.5

[56] References Cited

U.S. PATENT DOCUMENTS

| | | | |
|---|---|---|---|
| 2,991,664 | 7/1961 | Bernotas | 74/711 |
| 3,133,454 | 5/1964 | Padlo | 74/710.5 |
| 3,229,550 | 1/1966 | Nickell | 74/711 |
| 3,400,610 | 9/1968 | Taylor et al. | 74/710.5 |
| 3,606,803 | 9/1971 | Ottemann | 74/711 |
| 3,732,752 | 5/1973 | Louckes | 74/710.5 |
| 3,831,462 | 8/1974 | Baremor | 74/711 |
| 4,389,909 | 6/1983 | Groscenski, Jr. | 74/711 |
| 4,583,424 | 4/1986 | von Hiddessen et al. | 74/710.5 |

Primary Examiner—Dirk Wright
Attorney, Agent, or Firm—L. J. Kasper

[57] ABSTRACT

A differential gear mechanism is provided of the type including a gear case (11) at least one input pinion gear (19) and a pair of output side gears (23) and (25). A clutch pack (35) is disposed between one of the side gears and the gear case and is operable, when engaged, to retard relative rotation between the gear case and the side gear. Disposed adjacent the clutch pack is a cam means (23,43,45,47) which is operable to ramp-up and engage the clutch pack. An engagement shaft (53) is in splined engagement (49,55) with the cam member and has an opposite end extending through the gear case and in splined engagement (59,63) with a retarding gear member (61). An actuator (69) includes an actuation member (71) which moves from a first position (FIG. 1) to an actuated position in response to an external signal (73) to bias the retarding gear into engagment with the gear case, thus retarding rotation of the engagement shaft relative to the gear case, and retarding rotation of the cam means relative to the gear case, to cause engagement of the clutch pack.

8 Claims, 2 Drawing Sheets

ANTI-SPIN DIFFERENTIAL

BACKGROUND OF THE DISCLOSURE

The present invention relates to limited slip differentials, and more particularly, to such differentials of the type referred to as locking differentials, having means for retarding differentiating action, and actuating means for actuating the retarding means.

Limited slip and locking differentials of the type to which the present invention relates typically include a gear case defining a gear chamber and disposed therein, a differential gear set including at least one input pinion gear and a pair of output side gears. A clutch pack is typically disposed between one of the side gears and an adjacent surface of the gear case, such that the clutch pack is operable to retard, or even prevent, rotation between the gear case of the side gears. In a locking differential, disposed between the clutch pack and its adjacent side gear is a cam means, operable to engage the clutch pack upon relative rotation of the cam members.

In many limited slip and locking differentials, some sort of actuating mechanism is provided to actuate or move the clutch pack to its engaged condition. One of the current trends in the field of vehicle traction modifiers involves the desire to be able to actuate the clutch packs in response to an external signal, rather than in response to the sensing of a predetermined speed differential as has typically been the case in the prior art.

U.S. Pat. No. 4,583,424 illustrates a locking differential in which the clutch is actuated by an actuator of the piston-cylinder type. The device illustrated in U.S. Pat. No. 4,583,424 may be generally satisfactory from an operational standpoint, the overall device is excessively complex, requiring fluid passages and expensive seal arrangements.

Another prior art device is shown in U.S. Pat. No. 3,133,454, which illustrates a locking differential in which the locking is accomplished electromagnetically, in response to an input electrical signal. This device is also excessively complex, requiring electromagnetic coils within the differential case, and a substantial increase in the total number of parts.

SUMMARY OF THE INVENTION

Accordingly, it is an object of the present invention to provide an improved limited slip or locking differential of the type in which the clutch pack is actuated in response to an external signal, wherein the differential overcomes the problems associated with the prior art devices.

More specifically, it is an object of the present invention to provide an improved limited slip or locking differential in which the clutch actuating means is a cam means which is actuated by an actuating mechanism disposed external to the differential case.

It is a related object of the present invention to provide an improved limited slip or locking differential which achieves the above-stated objects, and which is relatively simple in construction, and requires relatively little modification of the limited slip and locking differentials now commercially available.

The above and other objects of the present invention are accomplished by the provision of an improved differential gear mechanism of the type described above including a gear case disposed within an outer differential housing and defining an axis of rotation and a gear chamber. A differential gear means is disposed in the gear chamber, and includes at least one input gear and first and second output gears. A lock-up means is provided for locking up the differential gear means, and includes clutch means operable between an engaged condition effect to retard relative rotation between the gear case and the output gears, and a disengaged condition. The lock-up means further includes cam means operatively associated with the clutch means, the cam means including first and second cam members, the second cam member being axially movable relative to the first cam member in response to relative rotation to effect the engaged condition of the clutch means. One of the cam members defines an outer peripheral retarding surface. An elongated engagement member defines the axis of rotation and is mounted for rotation relative to the gear case and is operatively associated with the retarding surface whereby rotation of either of the output gears relative to the gear case causes rotation of the engagement member relative to the gear case. The gear mechanism also includes means for retarding rotation of the elongated engagement member relative to the gear case.

The improved differential gear mechanism is characterized by the elongated engagement member being supported by the gear case at two axially-spaced apart locations, and including a terminal portion extending through the gear case to the exterior thereof. The retarding means includes a retarding mechanism, including a portion fixedly mounted relative to the outer differential housing, the retarding mechanism including an actuation member movable in response to an external signal between a first position and a second position. The retarding means further includes a retarding member disposed to rotate about the axis of rotation of the gear case and operably associated with the terminal portion of the engagement member. The actuation member, in its first position, permits the retarding member and the engagement member to rotate relative to the gear case. The actuation member, in its second position, engages the retarding member and retards its rotation relative to the gear case, thus retarding rotation of the engagement member about its axis, and retarding rotation of the cam member defining the outer peripheral retarding surface.

DESCRIPTION OF THE PREFERRED EMBODIMENTS

Figure 1:
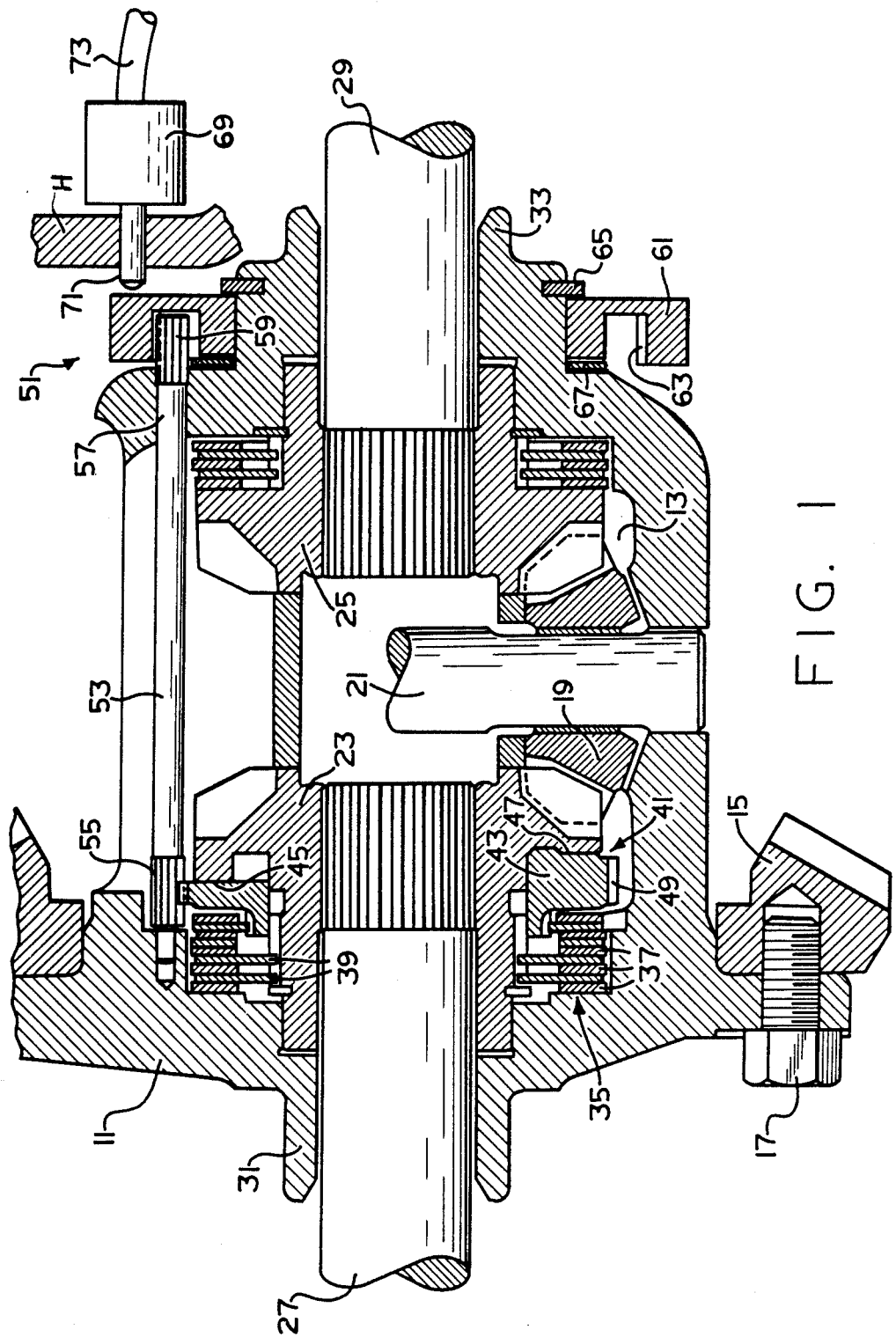
FIG. 1 is an axial cross-section of a locking differential mechanism, illustrating the present invention, partly in plan view, and partly in schematic.

Referring now to the drawings, which are not intended to limit the present invention, FIG. 1 is an axial cross-section of a locking differential gear mechanism of the type with which the present invention may be utilized. The construction and operation of the locking differential illustrated in FIG. 1 may be better understood by reference to U.S. Pat. No. 3,831,462, assigned to the assignee of the present invention and incorporated herein by reference.

The differential gear mechanism includes a gear case 11 which defines therein a gear chamber, generally designated 13. Torque input to the differential mechanism is typically by means of an input ring gear 15 (shown only fragmentarily in FIG. 1). The ring gear 15 may be attached to the gear case 11 by means of a plurality of bolts 17.

Disposed within the gear chamber 13 is a differential gear set including a plurality of planet pinions 19 (only one of which is shown in FIG. 1), rotatably mounted on a pinion shaft 21, which is secured to the gear case 11 by any suitable means. The planet pinions 19 comprise the input gears of the differential gear set, and are in meshing engagement with a pair of side gears 23 and 25, which comprise the output gears of the differential gear set. The side gears 23 and 25 are splined to a pair of axle shafts 27 and 29, respectively. The gear case 11 includes annular hub portions 31 and 33, on which may be mounted a pair of bearing sets (not shown in FIG. 1) used to provide rotational support for the differential mechanism relative to the outer differential housing H (shown only fragmentarily in FIGS. 1 and 2).

As is well known to those skilled in the art, during normal, straight-ahead operation of the vehicle, no differentiation occurs between the left and right axle shafts 27 and 29, and therefore, the pinions 19 do not rotate relative to the pinion shaft 21. The gear case 11, the pinions 19, the side gears 23 and 25, and the axle shafts 27 and 29 all rotate about the axis of rotation of the shafts 27 and 29 as a solid unit.

Under certain operating conditions, such as when the vehicle is turning, or a slight difference in the tire size exists, it is permissible for a certain amount of differentiating action to occur between the side gears 23 and 25. Above a certain, predetermined differential between the speeds of the side gears 23 and 25, it is desirable to retard the relative rotation between the gear case 11 and the side gears 23 and 25, in order to prevent excessive differentiating action. There may also be operating conditions wherein it is desirable to lock up the differential mechanism, to prevent any differentiating action, even before it has a chance to occur.

In order to retard differentiating action, the differential gear mechanism is provided with a lock-up means for locking up the differential gear set, and an actuating means for actuating the lock-up means. The general construction and operation of the lock-up means is well known in the art and will be described only briefly herein. For a more detailed explanation of the lock-up means, reference should be made to above-incorporated U.S. Pat. No. 3,831,462.

In the subject embodiment, the lock-up means comprises a clutch pack, generally designated 35, including a plurality of clutch discs 37 splined to the gear case 11, and a plurality of clutch discs 39 splined to the side gear 23. The lock-up means further includes a cam mechanism, generally designated 41. As is well known to those skilled in the limited slip and locking differential arts, the primary function of the cam mechanism 41 is to effect movement of the clutch pack 35 from the disengaged condition shown in FIG. 1 to an engaged condition. In the engaged condition, the clutch pack 35 is effective to retard relative rotation between the gear case 11 and the side gears 23 and 25.

The cam mechanism 41 includes the side gear 23 and a main cam member 43. The side gear 23 defines a cam surface 45, and the cam member 43 defines a cam surface 47. The cam member 43 also defines a set of external splines 49, the function of which will be described subsequently. During normal, straight-ahead operation of the vehicle, with little or no differentiation occurring, the cam surfaces 45 and 47 remain in the neutral position shown in FIG. 1, and the cam member 43 rotates with the side gear 23, at the same rotational speed. Movement of the clutch pack 35 to the engaged condition may be accomplished by retarding rotation of the cam member 43, relative to the side gear 23, which causes "ramping" of the cam surfaces 45 and 47, resulting in axial movement of the cam member 43 to the left in FIG. 1.

In order to retard rotation of the cam member 43, relative to the side gear 23, the differential gear mechanism of the present invention includes an actuating mechanism, shown somewhat schematically in FIG. 1 and generally designated 51. The mechanism 51 includes an elongated engagement shaft 53, having its left end (as viewed in FIG. 1), journalled within an opening in the gear case 11. The engagement shaft 53 includes a set of external splines 55, which are in engagement with the external splines 49 on the outer periphery of the main cam member 43. It will be understood by those skilled in the art that the use of the term "splines" herein can include gear teeth, or various other elements whereby it is possible to transmit sufficient retarding torque from the shaft 53 to the cam member 43.

It is an essential feature of the present invention that at least one end of the engagement shaft 53 include (at its right end in FIG. 1) a terminal portion 57. The terminal portion 57 includes a set of external splines 59, which is disposed external to the gear case 11. Also disposed external to the gear case 11 is a retarding gear 61, which defines, on an inner periphery, a set of internal splines 63 in engagement with the external splines 59 on the shaft 53. The retarding gear 61 is retained, axially, in the position shown on a hub portion of the gear case 11 by means of a snap ring 65. Disposed axially between the retarding gear 61 and the adjacent transverse surface of the gear case 11 is a friction member 67, the function of which will be described subsequently.

The remaining portion of the actuating mechanism 51 is shown only schematically in FIG. 1. Disposed adjacent the retarding gear 61, and fixed relative to the outer housing H, is an actuator 69, having an actuation member 71 extending to the left from the actuator 69, toward the retarding gear 61. It will be understood by those skilled in the art that, within the scope of the present invention various types of actuators may be used. In the embodiment shown in FIG. 1, the actuator 69 is of the piston-cylinder type, with the actuation member 71 moving from the disengaged position shown in FIG. 1 to an engaged position in response to an external fluid pressure signal, received through a fluid pressure line 73.

In operation, when it is necessary or desirable to limit the differentiation between the side gears 23 and 25, a fluid pressure signal is communicated through the line 73 to the actuator 69, causing movement of the actuation member 71 to the left in FIG. 1 until it engages the retarding gear 61. It will be apparent to those skilled in the art that there needs to be a greater coefficient of friction between the gear case 11, the friction member 67, and the gear 61, than between the gear 61 and the adjacent surface of the actuation member 71, which is the primary reason for the inclusion of the friction member 67. The frictional engagement of the gear case 11, member 67, and the retarding gear 61 causes the gear 61, to rotate with the gear case 11, thus retarding rotation of the engagement shaft 53 about its axis, relative to the gear case 11. As explained previously, preventing rotation of the shaft 53 about its axis will retard rotation of the main cam member 43 and the side gear 23, relative to the gear case 11, causing ramp up of the cam surfaces 45 and 47 to engage the clutch pack 35.

FIG. 2 Embodiment

Figure 2:
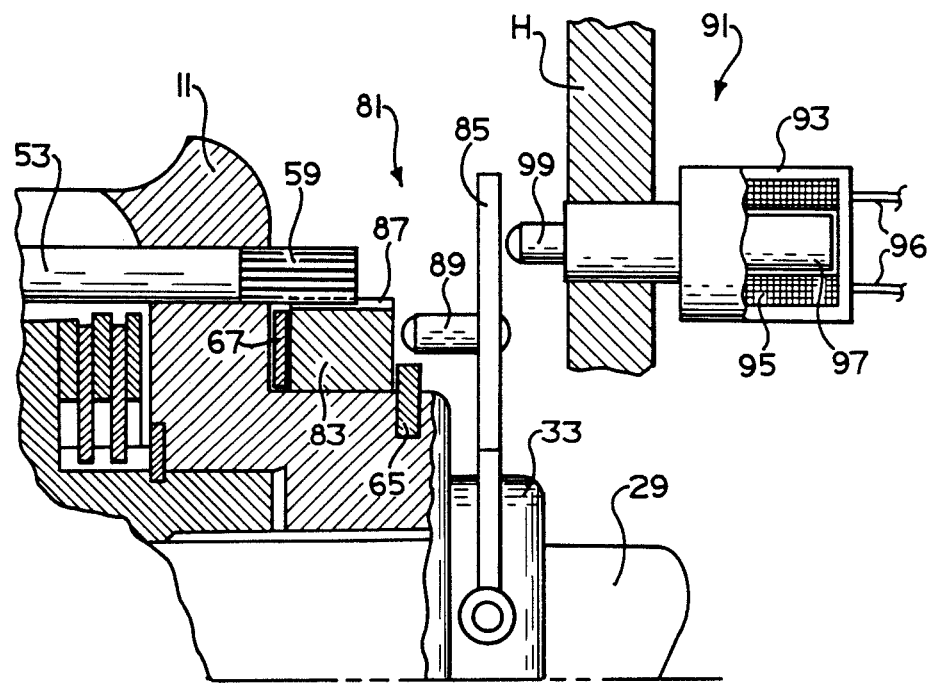
FIG. 2 is an enlarged, fragmentary view, similar to FIG. 1, illustrating another embodiment of the present invention.

Reference will now be made to FIG. 2, illustrating an alternative embodiment of the invention which, in many vehicle applications may comprise the preferred embodiment of the present invention. In FIG. 2, elements which are the same or substantially the same as in FIG. 1 bear the same reference numeral as in FIG. 1, whereas elements which are substantially different bear reference numerals in excess of 80.

The differential gear mechanism illustrated in FIG. 2 includes an actuating mechanism, generally designated 81, which includes a retarding gear 83. The retarding gear 83 is disposed about an annular outer surface of the gear case 11, and defines a set of external splines 87, in engagement with the splines 59 on the engagement shaft 53. Disposed immediately to the right (in FIG. 2) of the retarding gear 83, is the snap ring 65, and further to the right thereof is a lever member 85, which is pivotally attached to the gear case 11 by any suitable means. The lever member 85 includes an engagement member 89, which preferably may comprise a roller or bearing member, or some other relatively low friction member, for the same reason that was stated, in connection with the FIG. 1 embodiment, regarding the relatively low coefficient of friction between the actuation member 71 and the retarding gear 61.

Disposed adjacent the retarding gear 83 is a retarding mechanism, generally designated 91. The mechanism 91 comprises an electromagnetic actuator including a housing 93 which is fixed relative to the outer differential housing H. Disposed within the housing 93 is an electromagnetic coil 95, and disposed within the coil 95 is an electromagnetic plunger 97, operable to move axially in response to changes in the voltage and/or current impressed across the coil 95. A pair of electrical leads 96 are connected to the coil 95, and may provide the electrical input signal from a logic source, such as the vehicle's on-board microprocessor. Extending to the left in FIG. 2 from the plunger 97 is an actuation member 99, positioned to move into engagement with the lever member 85, in response to a predetermined input signal to the coil 95.

Therefore, when differentiation between the side gears 23 and 25 is permissible, there is no input signal to the coil 95, and the plunger 97 and actuation member 99 are retracted (to the right in FIG. 2) to the inactive or disengaged position. When a voltage is applied across the coil 95, the plunger 97 and actuation member 99 are moved to the left in FIG. 2, applying a force to the upper end of the lever member 85, causing the member 85 to pivot slightly counter-clockwise, so that the engagement member 89 engages the retarding gear 83, biasing it into frictional engagement with the gear case 11, by means of the friction member 67, in the same manner as was described in connection with the FIG. 1 embodiment. Such engagement retards rotation of the shaft 53 about its axis, and thus retards rotation of the cam member 43 and side gear 23, relative to the gear case 11, which has the effect of limiting the differentiation between the side gears 23 and 25 as described previously in connection with the FIG. 1 embodiment.

The invention has been described in great detail, sufficient to enable one skilled in the art to make and use the same. Various alterations and modifications will occur to those skilled in the art upon a reading and understanding of the specification, and it is intended to include all such alterations and modifications insofar as they come within the scope of the appended claims.

I claim:

1. A differential gear mechanism of the type including a gear case disposed within an outer differential housing and defining an axis of rotation and a gear chamber; differential gear means disposed in said gear chamber, said differential gear means including at least one input gear and first and second output gears; lock-up means for locking up said differential gear means to retard differentiating action, said lock-up means including clutch means operable between an engaged condition, effective to retard relative rotation between said gear case and said output gears, and a disengaged condition, said lock-up means further including cam means operatively associated with said clutch means, and including first and second cam members, said second cam member being axially movable relative to said first cam member in response to relative rotation therebetween to effect said engaged condition of said clutch means, one of said first and second cam members defining an outer peripheral retarding surface; an elongated engagement member defining an axis of rotation, being mounted for rotation relative to said gear case, and operably associated with said outer peripheral retarding surface, whereby rotation of either of said output gears relative to said gear case causes rotation of said engagement member relative to said gear case; and retarding means for retarding rotation of said elongated engagement member relative to said gear case; characterized by:

(a) said elongated engagement member being supported by said gear case at two axially spaced-apart locations, and including a terminal portion extending through said gear case to the exterior thereof;

(b) said retarding means including a retarding mechanism, including a portion fixedly mounted relative to said outer differential housing, said retarding mechanism including an actuation member movable, in repsonse to an external signal, between a first position and a second position;

(c) said retarding means further including a retarding member, disposed to rotate about the axis of rotation of the gear case, and operably associated with said terminal portion of said engagement member, whereby, in said first position, said actuation member permits said retarding member and said engagement member to rotate relative to said gear case, and in said second position, said actuation member engages said retarding member, retarding its rotation relative to said gear case, thus retarding rotation of said engagement member about its axis, and retarding the rotation of said one of said cam members defining said outer peripheral retarding surface.

2. A differential gear mechanism as claimed in claim 1 characterized by said outer peripheral retarding surface comprising a first plurality of splines disposed about the outer periphery of said one of said cam members, said elongated engagement member defining a second plurality of splines in engagement with said first plurality of splines, whereby rotation of said engagement member relative to its axis of rotation causes rotation of said one of said cam members relative to said gear case.

3. A differential gear mechanism as claimed in claim 2 characterized by said terminal portion of said elongated engagement member including a third plurality of splines, disposed externally of said gear case, and said retarding member including a fourth plurality of splines, in engagement with said third plurality of splines, whereby prevention of rotation of said retarding member relative to said gear case prevents rotation of said engagement member about its axis of rotation.

4. A differential mechanism as claimed in claim 1 characterized by said retarding mechanism comprising electromagnetic means operable in response to an external electrical signal to move said actuation member between said first position and said second position.

5. A differential mechanism as claimed in claim 1 characterized by said retarding member including a portion extending radially outward beyond said engagement member, said actuation member engaging said radially-outward portion when said actuation member is in said second position.

6. A differential mechanism as claimed in claim 5 characterized by said radially-outward portion defining said fourth plurality of splines.

7. A differential mechanism as claimed in claim 1 characterized by said retarding mechanism including a lever member pivotally mounted relative to said gear case, said lever member including means adapted to engage said retarding member, said actuation member being disposed adjacent said lever member and operable, when in said second position, to move said lever member toward said retarding member.

8. A differential mechanism as claimed in claim 1 characterized by said retarding mechanism comprising a piston-cylinder actuator operable in response to an external fluid pressure signal to move said actuation member between said first position and said second position.

* * * * *